US00RE44279E

(19) United States
(12) Reissued Patent
Stark et al.

(10) Patent Number: US RE44,279 E
(45) Date of Reissued Patent: Jun. 11, 2013

(54) LAMP POWER PULSE MODULATION IN COLOR SEQUENTIAL PROJECTION DISPLAYS

(75) Inventors: Steven E. Stark, Portland, OR (US); Henry Frazier Pruett, Sandy, OR (US)

(73) Assignee: Seiko Epson Corporation, Tokyo (JP)

(21) Appl. No.: 13/584,276

(22) Filed: Aug. 13, 2012

Related U.S. Patent Documents

Reissue of:
(64) Patent No.: 6,520,648
Issued: Feb. 18, 2003
Appl. No.: 09/778,225
Filed: Feb. 6, 2001

(51) Int. Cl.
*G03B 21/20* (2006.01)
*H04N 9/12* (2006.01)

(52) U.S. Cl.
USPC ..... 353/85; 353/86; 348/743

(58) Field of Classification Search
USPC 353/39, 49, 81, 84, 85, 86; 348/743; 362/295
See application file for complete search history.

(56) References Cited

U.S. PATENT DOCUMENTS

| | | | |
|---|---|---|---|
| 4,713,683 | A | 12/1987 | Fujimori et al. |
| 5,233,385 | A | 8/1993 | Sampsell |
| 5,706,061 | A | 1/1998 | Marshall et al. |
| 5,917,557 | A | 6/1999 | Toyoda |
| 6,054,832 | A | 4/2000 | Kunzman et al. |
| 6,155,687 | A | 12/2000 | Peterson |
| 6,252,636 | B1 | 6/2001 | Bartlett |
| 6,377,236 | B1 | 4/2002 | Karamoto |

FOREIGN PATENT DOCUMENTS

| | | |
|---|---|---|
| JP | A-60-111916 | 6/1985 |
| JP | A-02-119005 | 5/1990 |
| JP | A-08-505031 | 5/1996 |
| WO | WO 95/11572 | 4/1995 |
| WO | WO 97/24871 | 7/1997 |

OTHER PUBLICATIONS

Jul. 12, 2002 Search Report issued in PCT/US02/00969.
Dec. 20, 2007 Search Report issued in European Patent Application No. 02709026.5.
Feb. 29, 2008 Office Action issued in European Patent Application No. 02709026.5.
Feb. 9, 2007 Office Action issued in Chinese Patent Application No. 02804629.3 (with translation).
Oct. 19, 2007 Office Action issued in Chinese Patent Application No. 02804629.3 (with translation).
Apr. 18, 2006 Office Action issues in Japanese Patent Application No. 2002-563074 (with translation).

*Primary Examiner* — William C Dowling
*Assistant Examiner* — Ryan Howard
(74) *Attorney, Agent, or Firm* — Oliff & Berridge, PLC

(57) ABSTRACT

A frame sequential color display projection system (110) of this invention includes an arc lamp (112) having a predetermined power rating for providing a source of polychromatic light that propagates through a color wheel (120) that sequentially provides R, G, B, and optionally, W light colors during respective sequential time periods. A display controller (131) is synchronized with the color wheel to generate color image data during the respective time periods. A light valve, such as a DMD (130), receives the color image data for generating the frame sequential color display. A lamp ballast (156) is also synchronized with the color wheel to provide nominal and boosted power levels (212) to the arc lamp during selected ones of the time periods such that the projector provides a brighter, color-adjusted display without requiring the arc lamp to operate at an average power level exceeding its predetermined power rating.

75 Claims, 3 Drawing Sheets

LAMP POWER PULSE MODULATION IN COLOR SEQUENTIAL PROJECTION DISPLAYS

Matter enclosed in heavy brackets [ ] appears in the original patent but forms no part of this reissue specification; matter printed in italics indicates the additions made by reissue.

RELATED APPLICATION(S)

Not Applicable

FEDERALLY SPONSORED RESEARCH OR DEVELOPMENT

Not Applicable

TECHNICAL FIELD

This invention relates to color sequential video and multimedia projectors and more particularly to lamp power pulsing apparatuses and methods for improving the projected brightness and color balance of such projectors.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals that control a digitally driven image-forming device, such as a liquid crystal display ("LCD") or a digital micro mirror device ("DMD").

Significant effort has been invested into developing projectors producing bright, high-quality, color images. However, the optical performance of conventional projectors is often less than satisfactory. For example, suitable projected image brightness is difficult to achieve, especially when using compact portable color projectors in a well-lighted room.

Because LCD displays have significant light attenuation and triple path color light paths are heavy and bulky, portable multimedia projectors typically employ DMD displays in a single light path configuration. Producing a projected color image with this configuration typically requires projecting a frame sequential image through some form of sequential color modulator, such as a color wheel.

The use of color wheels in frame sequential color ("FSC") display systems has been known for many years and was made famous (or infamous) in early attempts to develop color television sets. With technological advances, however, color wheel display implementations are still useful today.

FIG. 1 shows the operational concept of a typical prior art FSC display system 10 in which a sensor 12 senses a timing mark 14 to detect a predetermined color index position of a motor 16 that rotates a color wheel 18 having respective red ("R"), green ("G"), and blue ("B") filter segments. A light source- 20 projects a light beam 22 through color wheel 18 and a relay lens 24 onto a display device 26, such as an LCD-based light valve or a DMD. A display controller (not shown) drives display device 26 with sequential R, G, and B image data that are timed to coincide with the propagation of light beam 22 through the respective R, G, and B filter segments of color wheel 18. Popular commercially available color wheel-based FSC multimedia projection systems are the LP300 series manufactured by In Focus Systems, Inc., of Wilsonville, Oreg., the assignee of this application.

To improve their projected image brightness, multimedia projection systems typically employ a high-intensity discharge ("HID") arc lamp, which produces a point source of intense polychromatic light that is readily focused by a reflector onto a color wheel. HID arc lamps have many attributes, such as high intensity, efficiency, and reliability. Unfortunately, HID arc lamps provide more light at the blue end of the spectrum than at the red end. This leads to color balance problems, which prior workers attempted to solve in various ways including increasing the angular extent (physical size) of the color wheel R filter segment relative to the B filter segment and/or increasing the attenuation of the color wheel B filter segment relative to the R filter segment. Other workers tried reducing overall brightness levels through color lookup electronics to achieve "headroom" for color adjustments. Unfortunately these "solutions" either caused temporal artifacts or decreased image brightness.

Still other workers added a white ("W") filter segment to the color wheel to provide a "white peaking" function, which does increase image brightness albeit at a loss of color saturation. Yet others have simply employed more powerful arc lamps, which in compact portable projectors, leads to heat, size, weight, cost, and reliability issues.

What is needed, therefore, is a multimedia projection system having an improved technique for achieving increased image brightness, color saturation, and adjustable color-balance.

SUMMARY OF THE INVENTION

An object of this invention is, therefore, to provide an apparatus and a method for improving the brightness, color saturation, and color balance of an image projected by an FSC multimedia projector.

A frame sequential color display projection system of this invention includes an arc lamp having a predetermined power rating for providing a source of polychromatic light that propagates through a color wheel that sequentially provides R, G, B, and optionally, W light colors during respective sequential time periods. A display controller is synchronized with the color wheel to generate color image data during the respective time periods. A light valve, such as a DMD, receives the color image data for generating the frame sequential color display. A lamp ballast power supply is also synchronized with the color wheel to provide nominal and boosted power levels to the arc lamp during selected ones of the time periods such that the projector provides a brighter display without requiring the arc lamp to operate at an average power level exceeding its predetermined power rating.

In a preferred embodiment, the color wheel includes a W filter segment and the lamp ballast provides the boosted power level during the time period when the W filter segment traverses the light source to provide a W peaking function.

In an alternative embodiment, the color wheel provides R, G, and B light colors during respective first, second, and third time periods, and the lamp ballast provides different power levels to the arc lamp during predetermined combinations of the time periods to balance the colors displayed by the system.

In yet another alternative embodiment in which the arc lamp is deficient in R emission, the color wheel has R, G, and B filter segments with different angular extents, and the R filter segment has a larger angular extent to compensate for the reduced R emission of the arc lamp. The lamp ballast provides different power levels to the arc lamp during non-R time periods to compensate for the brightness loss resulting from the larger angular extent of the R filter segment.

The main advantages of this invention are that it boosts brightness or white peaking of an FSC projection system, enables color-balancing functions, and improves color saturation without resorting to higher average power illumination, reduced overall brightness, or decreased color saturation caused by increasing the angular extent of color wheel white segments.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 1:
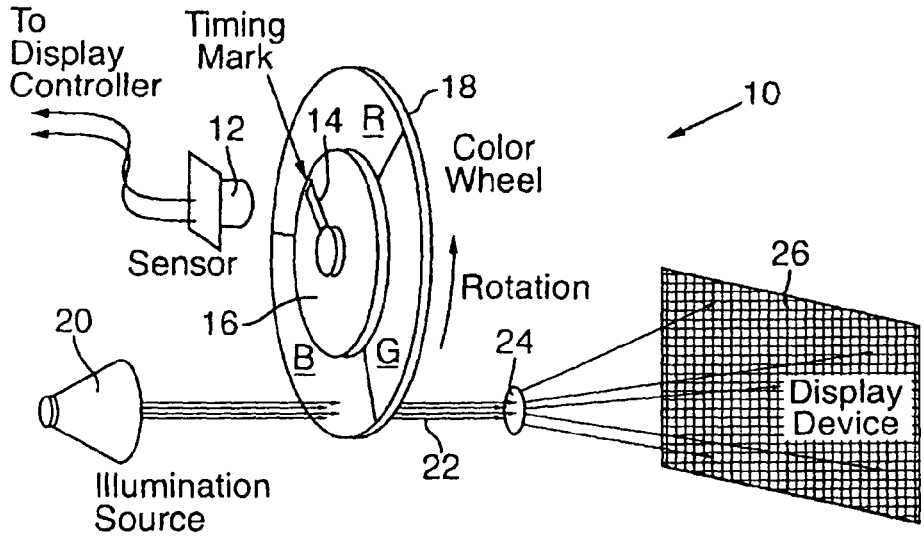
FIG. 1 (PRIOR ART)
FIG. 1 is a simplified pictorial diagram showing the operating principle of a prior art FSC display device employing a color wheel.
Figure 2:
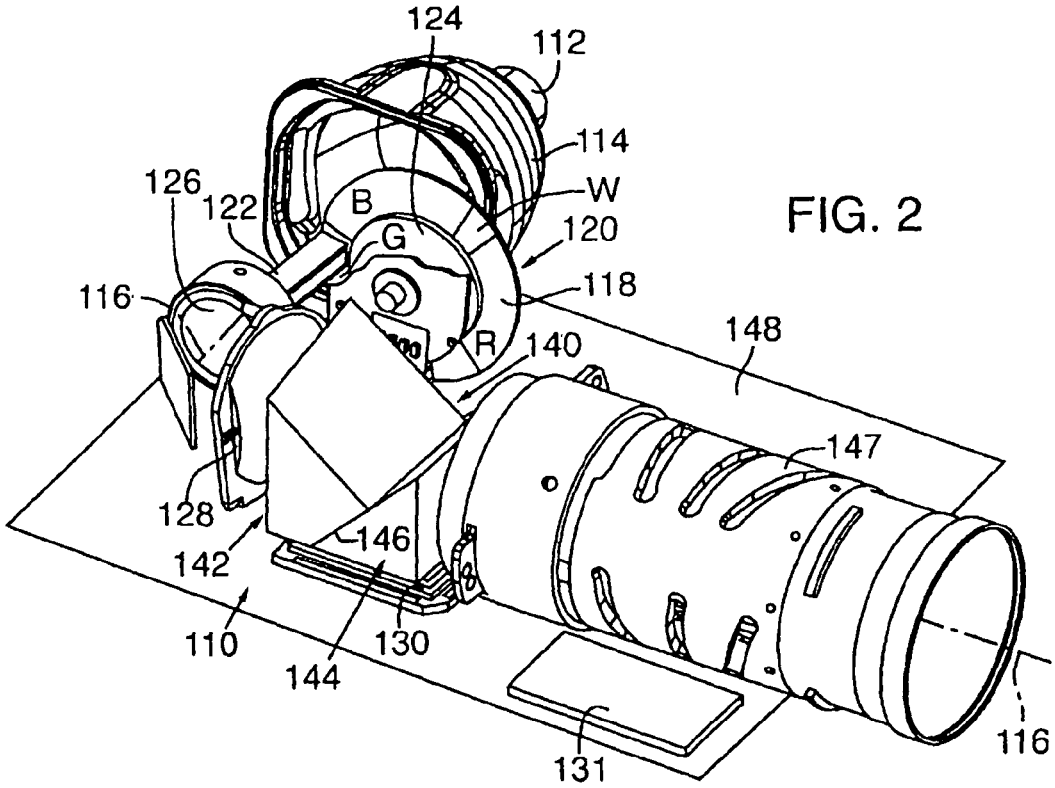
FIG. 2 is an isometric pictorial view of a preferred multimedia projector embodiment of this invention.

FIG. 2 shows a preferred embodiment of an image projection system 110 of this invention that includes a high power arc lamp 112 positioned at a focus of an elliptical reflector 114 having an F-number of approximately F/1 to produce a high intensity illumination beam that is characterized by a principal ray 116. Arc lamp 112 is preferably a 270 watt, high pressure mercury arc lamp, which is suitable for use in an image projector to achieve its lifetime and lumen specifications. The mercury arc lamp has a nominal 1.3 mm arc gap, which contributes to high efficiency operation of the projector engine of image projection system 110. The small size of the arc gap impacts the alignment of the lamp arc to the rest of the optical system and increases the importance of the stability of the arc itself. Arc lamp 112 is preferably a model SHP 270, manufactured by Phoenix, located in Himeji City, Japan, Arc lamp 112 is positioned at the first focus of elliptical reflector 114, which has a cold mirror that reflects forward only visible light. Much of the infrared and ultraviolet light is transmitted and absorbed in the housing of elliptical reflector 114. The second focus of elliptical reflector 114 is positioned one-half the distance between the front face of a rotating color wheel disk 118 of a color wheel assembly 120 and an integrator tunnel 122. Color wheel disk 118 includes R, G, and B segments and is rotated by a motor 124 at about 5,600 to 7,500 rpm, which is twice the range of system video image refresh rates, to sequentially display R, G, and B images on a projector screen (not shown). Color wheel disk 118 may also include a W (actually clear) segment that functions to increase lumens. All segments of color wheel disk 118 carry ultraviolet reflective coatings to prevent ultraviolet light from reaching ultraviolet light sensitive components in the optical system.

Integrator tunnel 122 creates at its output end a uniform illumination pattern and facilitates delivering the illumination light past motor 124 of color wheel assembly 120 so that motor 124 does not create a shadow in the illumination. Integrator tunnel 122 is composed of a solid glass rod that relies on total internal reflection to transfer light through it. Integrator tunnel 122 may also include a cladding that supports the integrator tunnel without disrupting total internal reflection. The uniform illumination pattern of light propagating from the output end of integrator tunnel 122 is of rectangular shape and is imaged through lens elements 126 and 128 and a prism assembly 140 (described below) onto a light reflecting surface of a DMD 130.

DMD 130 is preferably a Texas Instruments Model DMD 1076 spatial light modulator composed of a rectangular array of aluminum micro mechanical mirrors, each of which can be individually deflected at an angle of ±10 degrees about a hinged diagonal axis. The deflection angle (either positive or negative) of the mirrors is individually controlled by a display controller 131 that changes the memory contents of underlying addressing circuitry and mirror reset signals in DMD 130.

Illumination light exiting lens element 128 enters prism assembly 140 that is comprised of a first or compensating prism 142 and a second or output prism component 144 that are spaced apart by an air space interface 146. Prism assembly 140 allows DMD to lie flat when in operation. Prism assembly 140 sets up the correct illumination angle on DMD 130 and separates the illumination light from the imaging light reflected by DMD 130 in its on-state. The illumination angles for DMD 130 are controlled by the angles of the faces of prism assembly 140. Prism assembly 140 refracts and reflects the incident light bundle so that DMD 130 is illuminated from a corner with a projection angle partly built into the output light bundle. After the illumination light reflects of DMD 130 in its on-state, imaging light exits prism assembly 140 along essentially the same propagation direction as that of illumination light entering prism assembly 140. Because of the many degrees of freedom in prism assembly 140, light can enter it roughly parallel to a support table and in line with a projection lens 147. In a preferred case, DMD 130 is mounted to the surface of a single printed circuit board 148 that covers the bottom of the projector. This provides a cost-effective solution because it eliminates the need for a high-density electrical connector otherwise required between printed circuit board 148 and an off-board DMD.

Synchronization between the R, G, B, and W segments of color wheel assembly 120 and DMD color data generated by display controller 131 is achieved by optically detecting which color filter segment is in the light path and for how long. Particular colors of light propagating through the color wheel assembly are sensed to generate synchronization timing data as more fully described in allowed U.S. Pat. No. 6,155,687 for LIGHT GUIDE FOR USE IN A COLOR WHEEL SYNCHRONIZATION APPARATUS AND METHOD, which is assigned to the assignee of this application and is incorporated herein by reference.

Figure 3:
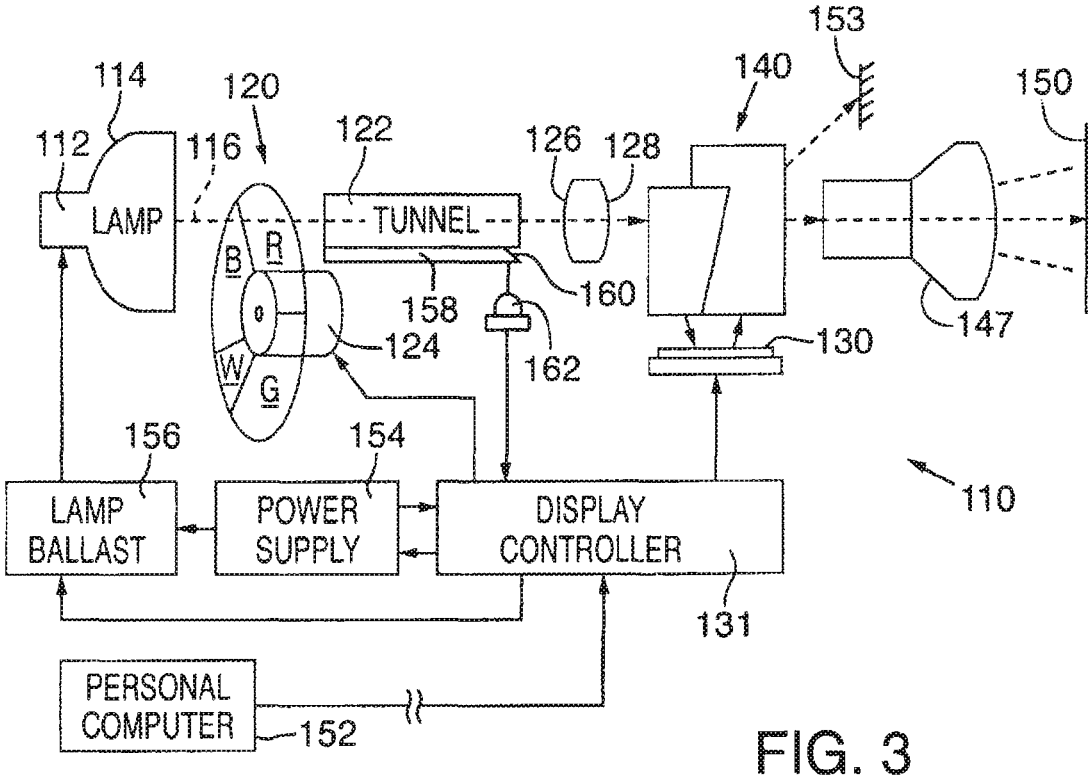
FIG. 3 is a schematic block diagram of a preferred image projection system of this invention showing functional interrelationships among electrical, mechanical, and optical components thereof.

FIG. 3 shows the inter-relationships among the major electrical, mechanical, and optical components of image projection system 110. In particular, display controller 131 forms an image on DMD 130. Arc lamp 112 illuminates the rotating R, G, B, and W filter segments of color wheel assembly 120 such that principal ray 116 propagates as FSC illumination through light integrating tunnel 122, lens elements 126 and 128, and prism assembly 140 to illuminate DMD 130. The FSC illumination impinging on DMD 130 reflects off the image formed thereon, propagates through prism assembly 140 and projection lens 147 to form a projected image (not shown) on a projection surface 150.

Display controller 131 receives color image data from a PC 152 and processes the image data into frame sequential R, G, B, and W image data, sequential frames of which are conveyed to DMD 130 in proper synchronism with the angular position of color wheel assembly 120. Display controller 131 controls DMD 130 such that light propagating from prism assembly 140 is selectively reflected by individual pixels within DMD 130 either toward projection lens 147 or toward a light dump area 153.

A power supply 154 powers display controller 131 and a lamp ballast 156 that regulates the power delivered to arc lamp 112. Power supply 154 also powers a cooling fan (not shown) and motor 124 that rotates color wheel assembly 120. Motor 124 rotates color wheel assembly 120 at about 6,650 to 7,500 rpm depending on the frame rate of the color image data received from PC 152 by display controller 131. Color wheel assembly 120 preferably includes R, G, W, and B filter segments that surround respective 119°, 104°, 40°, and 97° sectors of color wheel assembly 120.

Synchronization of the FSC data driving DMD 130 to the rotational angle of color wheel assembly 120 is achieved by optically detecting which filter segment color is intersecting principal ray 116 and for how long. Particular colors of light propagating through color wheel assembly 120 are sensed to generate synchronization timing data. In particular, some stray light rays reflected by reflector 114 propagate through color wheel assembly 120 at locations adjacent to integrator tunnel 122. To collect some of these stray rays, a light guide 158 is positioned adjacent to integrator tunnel 122. Light guide 158 has a slanted output end 160 that reflects the stray rays toward a photo detector 162 that conveys the timing data to display controller 131.

Figure 4:
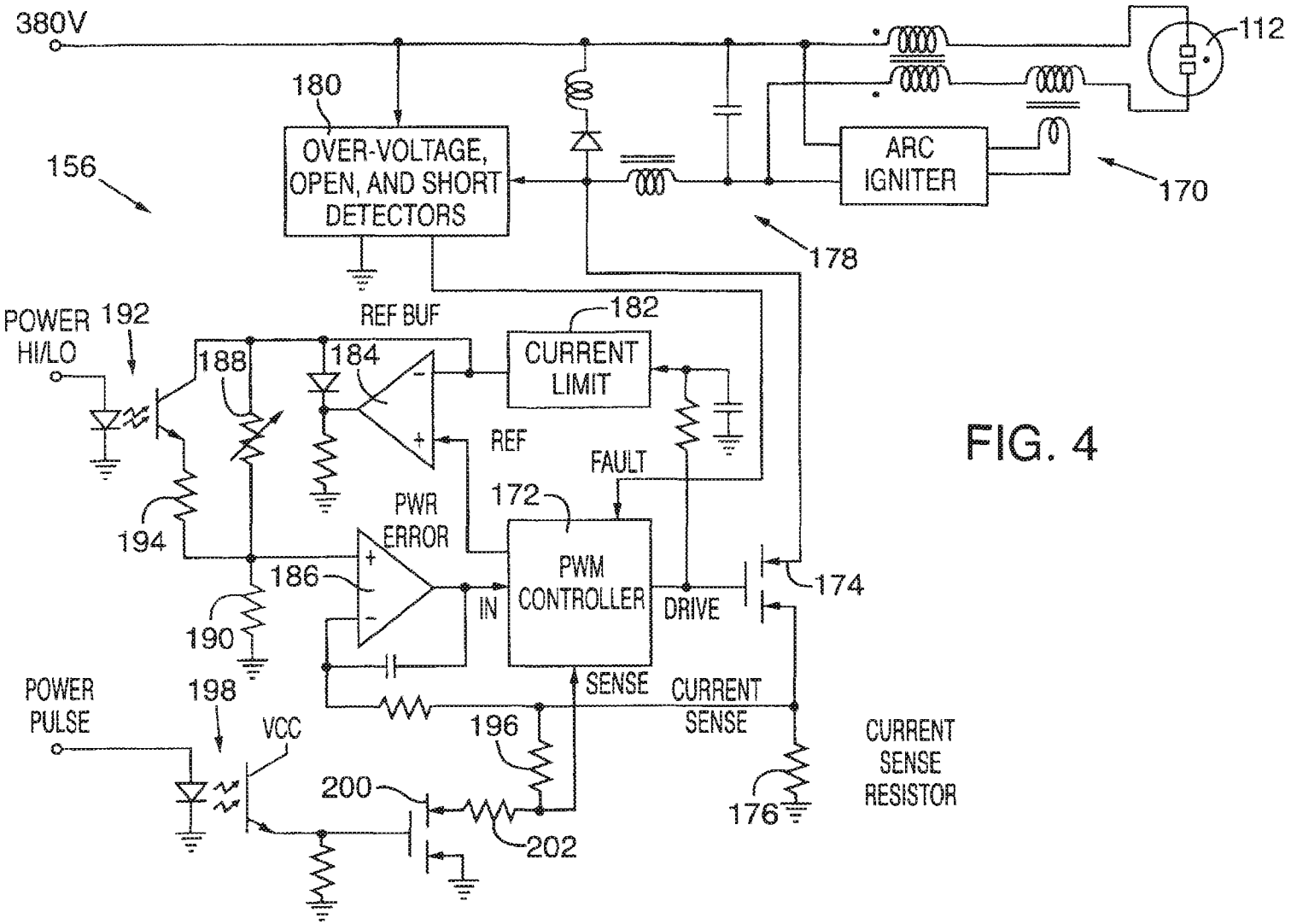
FIG. 4 is a simplified electrical schematic and block diagram of a pulsed arc lamp ballast circuit of this invention.

FIG. 4 shows lamp ballast 156 in more detail. In particular, lamp ballast 156 includes a conventional lamp igniter circuit 170, pulse-width-modulator ("PWM") controller 172, switching transistor 174, current sense resistor 176, and filter network 178 that coact to supply 50 to 100 volts DC at a nominal 3.6 amperes to arc lamp 112 after it is ignited. Current sense resistor 176 preferably comprises two 0.33 ohm resistors connected in parallel. Lamp ballast 156 also includes conventional over-voltage, open-, and short-circuit detectors 180.

PWM controller 172 operates in a power regulation control loop that includes a current limiter 182 and reference buffer amplifier 184 that condition and couple the "drive" signal operating switching transistor 174 to the non-inverting input of a power-error integrator 186. A current sense signal developed across current sense resistor 176 is coupled to the inverting input of power-error integrator 186. The loop is closed by connecting the output of power-error integrator 186 to a "multiplier" input of PWM controller 172. The regulation control loop is balanced when the average drive signal coupled to power-error integrator 186 equals the average current sense signal coupled from current sense resistor 176. PWM controller 172 further includes a "sense" input for regulating the magnitude of the drive signal in response to the instantaneous current sensed across current sense resistor 176.

The amount of power delivered by switching transistor 174 to arc lamp 112 is controllable as follows. The amount of drive signal coupled from current limiter 182 and reference buffer amplifier 184 to power-error integrator 186 is adjustable by a voltage divider comprising a variable resistor 188 and a fixed resistor 190. Decreasing the effective value of variable resistor 188 increases the power to arc lamp 112. Variable resistor 188 is adjusted to establish a nominal low power setting for lamp ballast 156. Also, the amount of drive signal coupled from current limiter 182 and reference buffer amplifier 184 to power-error integrator 186 is further increased by employing an opto-isolator 192 to switch a resistor 194 in parallel with variable resistor 188. Opto-isolator 192 receives a signal from display controller 131 for switching lamp ballast 156 between the nominal low power setting and a nominal high power setting. Switchable power settings are useful when transitioning through the below-described arc lamp 112 ignition, warmup, and sustained operation periods.

Lamp igniter circuit 170 generates greater than 10,000 volt pulses, preferably 20,000 volt pulses, during the ignition of arc lamp 112. Once an arc is established, the gas in the arc lamp 112 begins to ionize. As gas ionization continues, the arc voltage gradually increases along with the lamp temperature until arc lamp 112 reaches its full operating temperature after about two minutes. During this initial start-up period lamp ballast 156 preferably operates at the low power setting to prevent damage to the electrodes in arc lamp 112. As the temperature of arc lamp 112 increases, it draws more current. Once arc lamp 112 reaches full power, lamp ballast 156 is switched to operate at the high power setting and provides a substantially constant current and power to arc lamp 112.

Prior workers have pulsed the power delivered to arc lamps for arc stabilization purposes. However, unlike prior workers, applicants have discovered that the lumens, delivered by arc lamp 112 and focused through a 6 mm aperture, increases linearly with power. In particular, at 350 watts, arc lamp 112 delivers about 33 percent more lumens than at 250 watts. Applicants reasoned that the ability to rapidly change the luminous output of arc lamp 112 in a controlled manner could be used to adjust color balance, white peaking, and color saturation of FSC multimedia projectors, such as image projection system 110 (FIGS. 2 and 3).

However, the response time of the above-described power setting techniques is relatively slow because of long time-constant filtering in current limiter 182 and power-error integrator 186. Faster power setting response is required if lamp power changes are to be synchronized with the rotation of color modulation devices, such as color wheel 120.

Faster responding power control is achieved by controlling the amount of current sense signal coupled from current sense resistor 176 through a resistor 196 to the sense input of PWM controller 172. The amount of coupling is, preferably, attenuated by employing an opto-isolator 198 to switch a transistor 200 between on and off states, thereby shunting a portion of the current sense signal through a resistor 202 and transistor 200 to ground. Resistors 196 and 202 have respective 500 and 1,000 ohm values such that when transistor 200 is in its on state, the current sense signal coupled to PWM controller 172 is reduced by about 33 percent, and the power delivered to arc lamp 112 increases from about 260 watts to about 350 watts. Of course various other techniques for changing the current sense signal coupling may be employed, such as gain controlled amplification, switchable current sense resistors, and gain DACs. Digital or analog control techniques may be employed.

Preferably, however, opto-isolator 198 receives a power pulse signal from display controller 131 for switching lamp ballast 156 between the nominal 260 watt high power setting and the boosted 350 watt power setting during the time when the W filter segment is traversing principal ray 116. The power delivered to arc lamp 112 switches between the high and boosted settings in about 50 to 100 microseconds. This switching time is limited mainly by the ripple filtering components of filter network 178, but is, nevertheless, suitable for use in this invention as described below.

Figure 5:
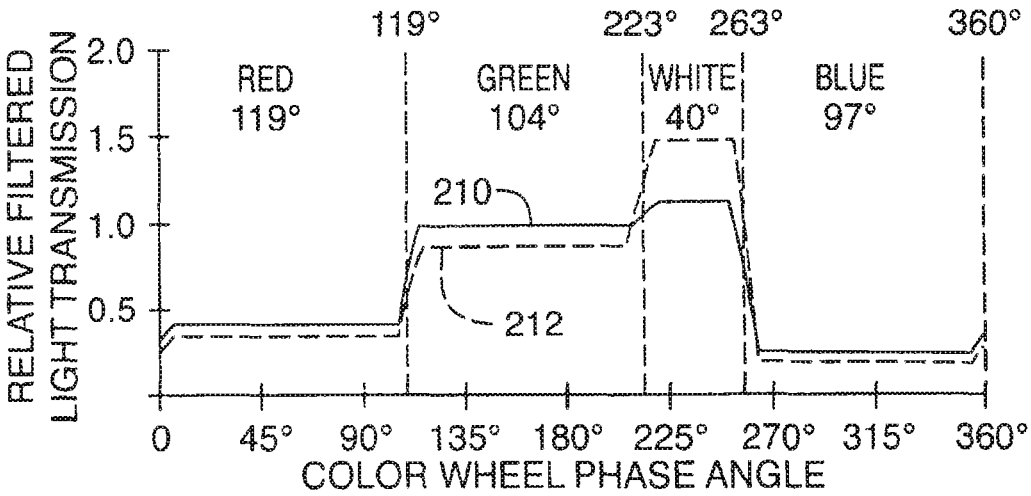
FIG. 5 is a graph representing relative filtered light transmission through a color wheel showing arc lamp power boost and recovery phases of this invention.

FIG. 5 represents the relative amounts of filtered light transmitted by the R, G, B, and W filter segments of color wheel assembly 120 as it rotates through a 360 degree rotation. A solid line 210 represents the relative light transmission with color wheel assembly 120 illuminated by a constant light source, whereas a dashed line 212 represents the relative light transmission with color wheel assembly 120 illuminated by pulsing arc lamp 112 in accordance with the preferred embodiment of this invention. In the embodiment shown by dashed line 212, the power to arc lamp 112 is set to the nominal 260 watt high power setting during the 320 degree rotation of the R, G, and B filter segments through principal ray 116 and is boosted to the 350 watt setting during the 40 degree rotation of the W filter segment through principal ray 116. The average power delivered to arc lamp 112 is, thereby, maintained at its 270 watt rated level over each complete rotation of color wheel assembly 120.

The power modulation is preferably implemented such that a color wheel rotation period is subdivided into at least one boosted power phase and a reduced power recovery phase. Display controller 131 employs photo detector 162 to detect when at least one of the R, G, B, and W filter segments of color wheel assembly 120 are traversing principal ray 116, and switches lamp ballast 156 between the high and boosted power settings at the correct time(s). The high and boosted power levels and filter segment angular extents are designed to maintain the average power to arc lamp 112 at its rated levels. Two possible color wheel implementations employing the same power switching levels, but different R, G, and B filter segment angular extents are shown below in Table 1.

TABLE 1

| Segment | Lamp Power | Degrees | Preferred Degrees |
|---|---|---|---|
| W | 350 | 40 | 40 |
| R | 260 | 106.67 | 119 |
| G | 260 | 106.67 | 104 |
| B | 260 | 106.67 | 97 |

The rotational period of color wheel assembly 120 is dependent on the incoming video refresh rate, and ranges between 8.06 msec and 10.7 msec per revolution. Therefore, each degree of rotation takes at least 22.4 microseconds, and the 40 degree W filter segment requires 896 microseconds to traverse principal ray 116. Accordingly, the 50-400 microsecond brightness rise time resulting from lamp ballast 156 pulsing arc lamp 112 is suitable for use with this invention.

A FSC projector incorporating either of the Table 1, color wheel embodiments is advantageous because it maintains the rated 270 Watts of average arc lamp power while providing more total light transmission (lumens) through color wheel assembly 120 because additional illumination is transmitted through the W segment without increasing its angular extent at the expense of the R, G, and B filter segments.

Alternative embodiments to lamp ballast 156 may include multiple switchable power amplitudes to accommodate finer control of the amount of light transmitted through each of the R, G, B, and (optional) W filter segments. The resultant luminance modulation, as a function of selected color phase, can be used in the following alternative embodiments:

1. Boosted illuminance can be associated with the W filter segment in an RGBW FSC system to boost total luminance output. This is referred to as "brightness peaking" or "white peaking"

2. Boosted illuminance can be associated with multiple W color wheel spoke transition segments in an RGBW color sequential system to boost total luminance output.

3. Boosted illuminance can be associated with a selected one of the R, G, and B color filter segments in a FSC system to boost luminance output for the selected color filter segment relative to the other color filter segments to control color balance independently of any gray scale image capability. This embodiment further enables:

a. Low luminance component color filter segments to be decreased in angular extent at boosted illuminance, levels, and high luminance component color filter segments to be increased in angular extent at reduced luminance levels, resulting in more effective distributions of the time sequential pulse width modulation bits driving DMD 130.

b. Low luminance component color filter segments to be decreased in angular extent at boosted illuminance levels, and high luminance component color filter segments to be increased in angular extent at reduced luminance levels, resulting in improved color balance with increased luminance output.

For example, the preferred embodiment represented by dashed line 212 of FIG. 5, the R filter segment spans 119 degrees, whereas the G and B filter segments respectively span only 104 and 97 degrees. This improves color balance and saturation by compensating for the reduced emission of arc lamp 112 at the red end of the spectrum and for the reduced need for blue brightness in many images. However, in this example lamp power boosting is applied only during passage of the W filter segment.

As a guide, the average power delivered to arc lamp 112 during one complete rotation of color wheel assembly 120 can be calculated by employing the following equation:

$$\text{Avg Pwr}[-]=\{(\text{reduced pwr}*\text{degrees})+(\text{boosted pwr}*\text{degrees})\}/360$$

Of course, the equation can be solved for any of the variables if the other variable are known, such as the rated power of arc lamp 112 and, for example, the 40 degree extent of the W filter segment. Various workable combinations of reduced and boosted power levels and filter segment angles can, thereby, be derived.

Skilled workers will recognize that portions of this invention may be implemented differently from the implementations described above for a preferred embodiment. For example, color wheel assembly 120 may include a different filter segment order, different colors, no white segment, and may be a color modulator other than a color wheel. DMD 130 may be one of many different light valve types, such as LCD, transmissive, or reflective types incorporated in a variety of different optical engines, some without a prism, a fly's eye lens integrator instead of an integrator tunnel, and different color wheel sync techniques, such as commutators, reflective strips, and optical sensors.

It will be obvious to those having skill in the art that many changes may be made to the details of the above-described embodiments of this invention without departing from the underlying principles thereof. The scope of this invention should, therefore, be determined only by the following claims.

We claim:

1. In a method for color balancing a display generated by a frame sequential color display system including an arc lamp having a power rating and providing polychromatic light including different amounts of a first light color and a second light color, a color modulator receiving the different amounts of light colors and propagating the first and second light colors during respective first and second time periods, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:

driving the arc lamp during the first time period at a power level that is less than the arc lamp power rating; and driving the arc lamp during the second time period at a boosted power level that is greater than the arc lamp power rating, such that the arc lamp operates during the first and second time periods at an average power level that substantially equals the arc lamp power rating and the display is color balanced by boosting the arc lamp brightness during the second time period and reducing the arc lamp brightness during the first time period without reducing the display average brightness.

2. The method of claim 1, in which the color display system is a projection display system.

3. The method of claim 1, in which the color modulator is a color wheel and at least the first and second light colors are produced by filtering the polychromatic light with corresponding color wheel filter segments selected from a red filter segment, a green filter segment, a blue filter segment, and a white filter segment.

4. The method of claim 1, in which the second light color is white.

5. The method of claim 1, in which the second light color is red.

6. The method of claim 1, further including a third light color and a third time period, and in which the color modulator sequentially propagates the first, second, and third light colors during respective first, second, and third time periods, the method further comprising driving the arc lamp during the third time period at a power level that is less than the arc lamp power rating.

7. The method of claim 1, in which the polychromatic light includes unequal amounts of red, green, and blue light and in which the color modulator sequentially propagates at least red, green, and blue light colors during respective first, second, and third time periods having predetermined durations that compensate for the unequal amounts of red, green, and blue light produced by the arc lamp.

8. The method of claim 7, in which the color modulator is a color wheel having filter segments and in which the predetermined durations are determined by red, green, and blue filter segments having angular extents corresponding to the predetermined durations.

9. The method of claim 8, in which at least two of the angular extents are unequal.

*10. The method of claim 1, in which the first light color includes at least one color selected from the group consisting of red, green, and blue, the second light color includes a boosted color, and a red time period is greater than a blue time period, which is greater than a boosted color time period.*

*11. The method of claim 1, in which the first light color includes at least one color selected from the group consisting of red, green, and blue, the second light color includes a boosted color, and a red time period is greater than a green time period, which are both greater than a boosted color time period.*

*12. The method of claim 1, in which the first light color includes at least one color selected from the group consisting of red, green, and blue, the second light color includes a boosted color, and a green time period is greater than a blue time period, which is greater than a boosted color time period.*

*13. The method of claim 1, in which the first light color includes at least one color selected from the group consisting of red, green, and blue, the second light color includes a boosted color, and a red time period is greater than a boosted color time period, a green time period is greater than the boosted color time period, and a blue time period is greater than the boosted color time period.*

*14. The method of claim 1, in which the second light color is a color selected from the group consisting of red, green, and blue, the first light color is at least one color selected from the group consisting of red, green and blue excluding the second light color, and the second time period is shorter than the first time period.*

*15. The method of claim 1, in which the second light color is a color selected from the group consisting of red, green, blue and white, the first light color is at least one color selected from the group consisting of red, green, blue and white excluding the second light color, and the second time period is shorter than the first time period.*

*16. The method of claim 1, in which the second light color is white, the first light color is at least one color selected from the group consisting of red, green and blue, and the second time period is shorter than the first time period.*

*17. The method of claim 1, in which the second light color includes a boosted color, the boosted color is white, a color wheel is selected as the color modulator, and the color wheel is configured to include a white segment that spans substantially 40 degrees of the color wheel.*

*18. The method of claim 1, in which the first light color includes at least one color selected from the group consisting of red, green, and blue, the second light color includes a boosted color, a red time period is provided before a green time period, the green time period is provided before a boosted color time period, and the boosted color time period is provided before a blue time period, in a color rotation.*

*19. The method of claim 1, in which the first light color includes at least one color selected from the group consisting of red, green, and blue, the first time period includes at least one time period selected from the group consisting of a red time period, a green time period and a blue time period, the second time period includes a transition period from the green period to the blue period.*

*20. The method of claim 1, a color wheel is selected as the color modulator, and the color wheel is configured to include a red segment, a green segment, a blue segment, and a boosted color segment, the boosted color segment being arranged between the blue and green segment.*

*21. The method of claim 1, a color wheel is selected as the color modulator, and the color wheel is configured to include a red segment, a green segment, a blue segment, and a boosted color segment, the boosted color segment being a a plurality*

*of transition segments that are arranged between the red segment and green segment, between the green segment and blue segment, and between the blue segment and red segment.*

*22. The method of claim 1, in which a difference between the boosted power level and arc lamp power rating is greater than a difference between the low power level and the arc lamp power rating.*

*23. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during and throughout respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during and throughout the first time period at less than the arc lamp power rating and driving the arc lamp during and throughout the second time period at the arc lamp power rating such that the arc lamp operates at an average power level that is less than the arc lamp power rating to color balance the display by reducing an arc lamp brightness during and throughout the first time period, thereby reducing an average brightness of the display, an improvement comprising:*

*driving the arc lamp during and throughout the first time period at a power level that is less than the arc lamp power rating; and*

*driving the arc lamp during and throughout the second time period at a boosted power level that is greater than the arc lamp power rating, such that the arc lamp operates during and throughout the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness, wherein the second time period is shorter than the first time period.*

*24. The method of claim 23, in which the color display system is a projection display system.*

*25. The method of claim 23, in which the color modulator is a color wheel and at least the first and second light colors are produced by filtering the polychromatic light with corresponding color wheel filter segments selected from a red filter segment, a green filter segment, a blue filter segment, and a white filter segment.*

*26. The method of claim 23, in which the second light color is white.*

*27. The method of claim 23, in which the second light color is red.*

*28. The method of claim 23, further including a third light color and a third time period within the frame cycle, and in which the color modulator sequentially propagates the first, second, and third light colors during and throughout respective first, second, and third time periods, the method further comprising driving the arc lamp during and throughout the third time period at a power level that is less than the arc lamp power rating.*

*29. The method of claim 23, in which the polychromatic light includes unequal amounts of red, green, and blue light and in which the color modulator sequentially propagates at least red, green, and blue light colors during and throughout respective first, second, and third time periods having predetermined durations that compensate for the unequal amounts of red, green, and blue light produced by the arc lamp.*

*30. The method of claim 29, in which the color modulator is a color wheel having filter segments and in which the predetermined durations are determined by red, green, and blue filter segments having angular extents corresponding to the predetermined durations.*

*31. The method of claim 30, in which at least two of the angular extents are unequal.*

*32. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during and throughout respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during and throughout the first time period at less than the arc lamp power rating and driving the arc lamp during and throughout the second time period at the arc lamp power rating such that the arc lamp operates at an average power level that is less than the arc lamp power rating to color balance the display by reducing an arc lamp brightness during and throughout the first time period, thereby reducing an average brightness of the display, an improvement comprising:*

*driving the arc lamp during and throughout the first time period at a power level that is less than the arc lamp power rating; and*

*driving the arc lamp during and throughout the second time period at a boosted power level that is greater than the arc lamp power rating, such that the arc lamp operates during and throughout the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness, wherein, for each frame cycle, the arc lamp is operated above the arc lamp power rating for a shorter period of time than the arc lamp is operated below the arc lamp power rating.*

*33. The method of claim 32, in which the color display system is a projection display system.*

*34. The method of claim 32, in which the color modulator is a color wheel and at least the first and second light colors are produced by filtering the polychromatic light with corresponding color wheel filter segments selected from a red filter segment, a green filter segment, a blue filter segment, and a white filter segment.*

*35. The method of claim 32, in which the second light color is white.*

*36. The method of claim 32, in which the second light color is red.*

*37. The method of claim 32, further including a third light color and a third time period within the frame cycle, and in which the color modulator sequentially propagates the first,*

*second, and third light colors during and throughout respective first, second, and third time periods, the method further comprising driving the arc lamp during and throughout the third time period at a power level that is less than the arc lamp power rating.*

*38. The method of claim 32, in which the polychromatic light includes unequal amounts of red, green, and blue light and in which the color modulator sequentially propagates at least red, green, and blue light colors during and throughout respective first, second, and third time periods having predetermined durations that compensate for the unequal amounts of red, green, and blue light produced by the arc lamp.*

*39. The method of claim 38, in which the color modulator is a color wheel having filter segments and in which the predetermined durations are determined by red, green, and blue filter segments having angular extents corresponding to the predetermined durations.*

*40. The method of claim 39, in which at least two of the angular extents are unequal.*

*41. In a method for color balancing a display generated by a frame sequential color display system that sequentially propagates a predetermined number of available light colors within a frame cycle each available light color being propagated for a respective color time period, the frame sequential color display system further including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness, wherein*

*the first color includes at least one color selected from the group consisting of red, green and blue,*

*the second color includes a boosted color, and*

*a red color time period is greater than a blue color time period, which is greater than a boosted color time period.*

*42. The method of claim 41, in which the boosted color is white.*

*43. The method of claim 42, in which a color wheel is selected as the color modulator, and the color wheel is configured to include a white segment that spans substantially 40 degrees of the color wheel.*

*44. The method of claim 41, in which the first light color includes red, green, and blue.*

*45. In a method for color balancing a display generated by a frame sequential color display system that sequentially propagates a predetermined number of available light colors within a frame cycle each available light color being propagated for a respective color time period, the frame sequential color display system further including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the first color includes at least one color selected from the group consisting of red, green and blue,*

*the second color includes a boosted color, and*

*a red color time period is greater than a green color time period, which is greater than a boosted color time period.*

*46. The method of claim 45, in which the boosted color is white.*

*47. The method of claim 46, in which a color wheel is selected as the color modulator, and the color wheel is configured to include a white segment that spans substantially 40 degrees of the color wheel.*

*48. The method of claim 45, in which the first light color includes red, green, and blue.*

*49. In a method for color balancing a display generated by a frame sequential color display system that sequentially propagates a predetermined number of available light colors within a frame cycle each available light color being propagated for a respective color time period, the frame sequential color display system further including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image*

*data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the first color includes at least one color selected from the group consisting of red, green and blue,*

*the second color includes a boosted color, and*

*a green color time period is greater than a blue color time period, which is greater than a boosted color time period.*

*50. The method of claim 49, in which the boosted color is white.*

*51. The method of claim 49, in which the boosted color is red.*

*52. The method of claim 50, in which a color wheel is selected as the color modulator, and the color wheel is configured to include a white segment that spans substantially 40 degrees of the color wheel.*

*53. The method of claim 49, in which the first light color includes red, green, and blue.*

*54. In a method for color balancing a display generated by a frame sequential color display system that sequentially propagates a predetermined number of available light colors within a frame cycle each available light color being propagated for a respective color time period, the frame sequential color display system further including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the first color includes at least one color selected from the group consisting of red, green and blue,*

*the second color includes a boosted color, and*

*a red color time period is greater than a boosted color time period, a green color time period is greater than the boosted color time period, a blue color time period is greater than the boosted color time period.*

*55. The method of claim 54, in which the boosted color is white.*

*56. The method of claim 55, in which a color wheel is selected as the color modulator, and the color wheel is configured to include a white segment that spans substantially 40 degrees of the color wheel.*

*57. The method of claim 54, in which the first light color includes red, green, and blue.*

*58. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein.*

*the second light color is one color selected from the group consisting of red, green and blue,*

*the first light color is at least one color selected from the group consisting of red, green, and blue excluding the second light color, and*

*the second time period is shorter than the first time period.*

*59. In a method for color balancing a display generated by a frame sequential color display system that sequentially propagates a predetermined number of available light colors within a frame cycle including an arc lamp having a power rating and providing polychromatic light including different amounts of a first light color and a second light color, a color*

*modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the second light color is one color selected from the group consisting of one of red, green, blue and white,*

*the first light color is at least one color selected from the group consisting of one of one of red, green, blue and white excluding the second light color, and*

*the second time period is shorter than the first time period.*

*60. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the second light color is white,*

*the first light color is at least one color selected from the group consisting of one of red, green, and blue, and*

*the second time period is shorter than the first time period.*

*61. The method of claim 60, in which a color wheel is selected as the color modulator, and the color wheel is configured to include a white segment that spans substantially 40 degrees of the color wheel.*

*62. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve in the form of a DMD made of an array of micro mirrors that are switched based on time sequential pulsed width modulation bits, the light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the second time period is longer than a brightness rise time, wherein the brightness rise time is a time necessary for the arc lamp to change power levels, and*

*the second time period is longer than the pulse width modulation bits driving the DMD.*

*63. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the*

*second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the second color includes a boosted color, the boosted color being white, and*

*the color modulator being a color wheel configured with a white segment that contains substantially 40 degrees of the color wheel.*

*64. In a method for color balancing a display generated by a frame sequential color display system that sequentially propagates a predetermined number of available light colors within a frame cycle each available light color being propagated for a respective color time period, the frame sequential color display system further including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the first light color includes at least one color selected from the group consisting of red, green, and blue,*

*the second light color includes a boosted color, and*

*a red color time period is provided in advance of a green color time period, the green color time period is provided in advance of a boosted color time period, the boosted color time period is provided in advance of a blue color time period, in a color rotation.*

*65. In a method for color balancing a display generated by a frame sequential color display system that sequentially propagates a predetermined number of available light colors within a frame cycle each available light color being propagated for a respective color time period, the frame sequential color display system further including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the first color includes at least one color selected from the group consisting of red, green and blue,*

*the first time period includes at least one time period selected from the group of a red color time period, a green color time period, and a blue color time period, and*

*the second time period includes a transition period from the green color time period to the blue color time period.*

*66. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the color modulator is selected to be a color wheel, the color wheel is configured with a red segment, a green segment, a blue segment, and a boosted color segment, and*

*the boosted color segment is arranged between the green segment and the blue segment.*

*67. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the color modulator is selected to be a color wheel, the color wheel is configured with a red segment, a green segment, a blue segment, and a boosted color segment, and*

*the boosted color segment is a plurality of transition segments that are arranged between the red segment and green segment, between the green segment and blue segment, and between the blue segment and red segment.*

*68. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a low power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness, wherein*

*a first difference between the boosted power level and the arc lamp power rating is greater than a second difference between the low power level and the arc lamp power rating.*

*69. The method of claim 68, in which a difference between the boosted power level and the low power level is substantially equal to 33 percent of the arc lamp power rating.*

*70. The method of claim 68, in which a difference between the boosted power level and the low power level is substantially equal to 90 watts.*

*71. The method of claim 68, in which a difference between the low power level and the arc lamp power rating is substantially equal to 3.7 percent of the arc lamp power rating.*

*72. The method of claim 68, in which a difference between the low power level and the arc lamp power rating is substantially equal to 10 watts.*

*73. The method of claim 41, in which a difference between the boosted power level and the arc lamp power rating is substantially equal to 30 percent of the arc lamp power rating.*

*74. The method of claim 68, in which a difference between the boosted power level and the arc lamp power rating is substantially equal to 80 watts.*

*75. In a method for color balancing a display generated by a frame sequential color display system that sequentially propagates a predetermined number of available light colors within a frame cycle including an arc lamp having a power rating and providing polychromatic light including different amounts of a first light color and a second light color, a color modulator receiving the different amounts of light colors and propagating the first and second light colors during respective first and second time periods within the frame cycle, a display controller generating first and second image data during the respective first and second time periods, a light valve generating the display in response to receiving the first and second light colors and the first and second image data during the first and second time periods, a lamp ballast driving the arc lamp during the first time period at less than the arc lamp power rating and driving the arc lamp during the*

*second time period at the arc lamp power rating such that the arc lamp operates at an average power level that is less than the arc lamp power rating to color balance the display by reducing an arc lamp brightness during the first time period, thereby reducing an average brightness of the display, an improvement comprising:*

*driving the arc lamp during the first time period at a power level that is less than the arc lamp power rating; and*

*driving the arc lamp during the second time period at a boosted power level that is greater than the arc lamp power rating, such that the arc lamp operates during the frame cycle, which includes the first and second time periods, at an average power level that substantially equals the arc lamp power rating and the display is color balanced by boosting the arc lamp brightness during the second time period and reducing the arc lamp brightness during the first time period without reducing the display average brightness; wherein*

*the color modulator is configured to produce a red, green, blue, and white colored light, and*

*the second time period includes a time during which the white colored light and one of the red, green and blue lights are transmitted.*

* * * * *

UNITED STATES PATENT AND TRADEMARK OFFICE

CERTIFICATE OF CORRECTION

PATENT NO. : RE44,279 E
APPLICATION NO. : 13/584276
DATED : June 11, 2013
INVENTOR(S) : Steven E. Stark et al.

It is certified that error appears in the above-identified patent and that said Letters Patent is hereby corrected as shown below:

In the Claims
Column 22, in line [45], claim 73, change:

"73. The method of claim 41"

to

"73. The method of claim 68"

Signed and Sealed this
Twenty-eighth Day of January, 2014

Michelle K. Lee

Michelle K. Lee
*Deputy Director of the United States Patent and Trademark Office*